United States Patent
Nammi et al.

(10) Patent No.: US 12,335,198 B2
(45) Date of Patent: Jun. 17, 2025

(54) METHOD TO CONFIGURE THE MULTI-SLOT PUSCH FOR HALF DUPLEX SYSTEMS

(71) Applicant: TELEFONAKTIEBOLAGET LM ERICSSON (PUBL), Stockholm (SE)

(72) Inventors: Sairamesh Nammi, Kista (SE); Thomas Chapman, Solna (SE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 17/799,793

(22) PCT Filed: Feb. 12, 2021

(86) PCT No.: PCT/IB2021/051214
§ 371 (c)(1),
(2) Date: Aug. 15, 2022

(87) PCT Pub. No.: WO2021/161269
PCT Pub. Date: Aug. 19, 2021

(65) Prior Publication Data
US 2023/0083914 A1    Mar. 16, 2023

Related U.S. Application Data

(60) Provisional application No. 62/976,926, filed on Feb. 14, 2020, provisional application No. 62/976,202, filed on Feb. 13, 2020.

(51) Int. Cl.
H04L 5/16     (2006.01)
H04L 1/1812   (2023.01)
H04L 5/00     (2006.01)

(52) U.S. Cl.
CPC .......... *H04L 5/0055* (2013.01); *H04L 1/1812* (2013.01); *H04L 5/16* (2013.01)

(58) Field of Classification Search
None
See application file for complete search history.

(56) References Cited

U.S. PATENT DOCUMENTS

2020/0106559 A1*  4/2020  Vilaipornsawai ..... H04L 1/1896
2021/0235439 A1*  7/2021  Wong .................... H04L 1/1854
(Continued)

OTHER PUBLICATIONS

Ericsson, "PUSCH Enhancements for NR URLLC", 3GPP TSG RAN WG1 Meeting #98, R1-1908122, Prague, CZ, Aug. 26-30, 2019.

(Continued)

*Primary Examiner* — Jenkey Van
(74) *Attorney, Agent, or Firm* — Sage Patent Group

(57) ABSTRACT

Systems and methods are disclosed herein for transmission of multi-slot Physical Uplink Shared Channel PUSCH with repetitions in a half-duplex system such as a Time Division Duplexing TDD system. A method performed by a wireless device for transmission of multi-slot PUSCH repetitions in a half-duplex system comprises: receiving, from a network node, information related to slot-based configuration in a plurality of slots or mini-slots in the half-duplex system (400); determining multiple consecutive uplink symbols in the plurality of slots or mini-slots based on the information received from the network node (402); transmitting PUSCH repetitions to the network node in the determined multiple consecutive uplink symbols in the plurality of slots or mini-slots (404). In this manner, the uplink multi-slot operation is facilitated, the uplink transmission gain is increased and the coverage of the TDD system is improved.

17 Claims, 14 Drawing Sheets

(56) References Cited

U.S. PATENT DOCUMENTS

2022/0132533 A1\* 4/2022 Taherzadeh Boroujeni ................
 H04L 5/0092
2022/0287073 A1\* 9/2022 Wong .................... H04W 72/23
2022/0312483 A1\* 9/2022 Bae ......................... H04L 1/189
2024/0196378 A1\* 6/2024 Lee .......................... H04L 5/14

OTHER PUBLICATIONS

Huawei, et al., "PUSCH enhancements for URLLC", 3GPP TSG RAN WG1 Meeting #96, R1-1901559, Athens, Greece, Feb. 25-Mar. 1, 2019.

Motorola Mobility, et al. "PUSCH enhancement for URLLC", 3GPP TSG RAN WG1 Meeting #98, R1-1909154, Prague, CZ, Aug. 26-30, 2019.

\* cited by examiner

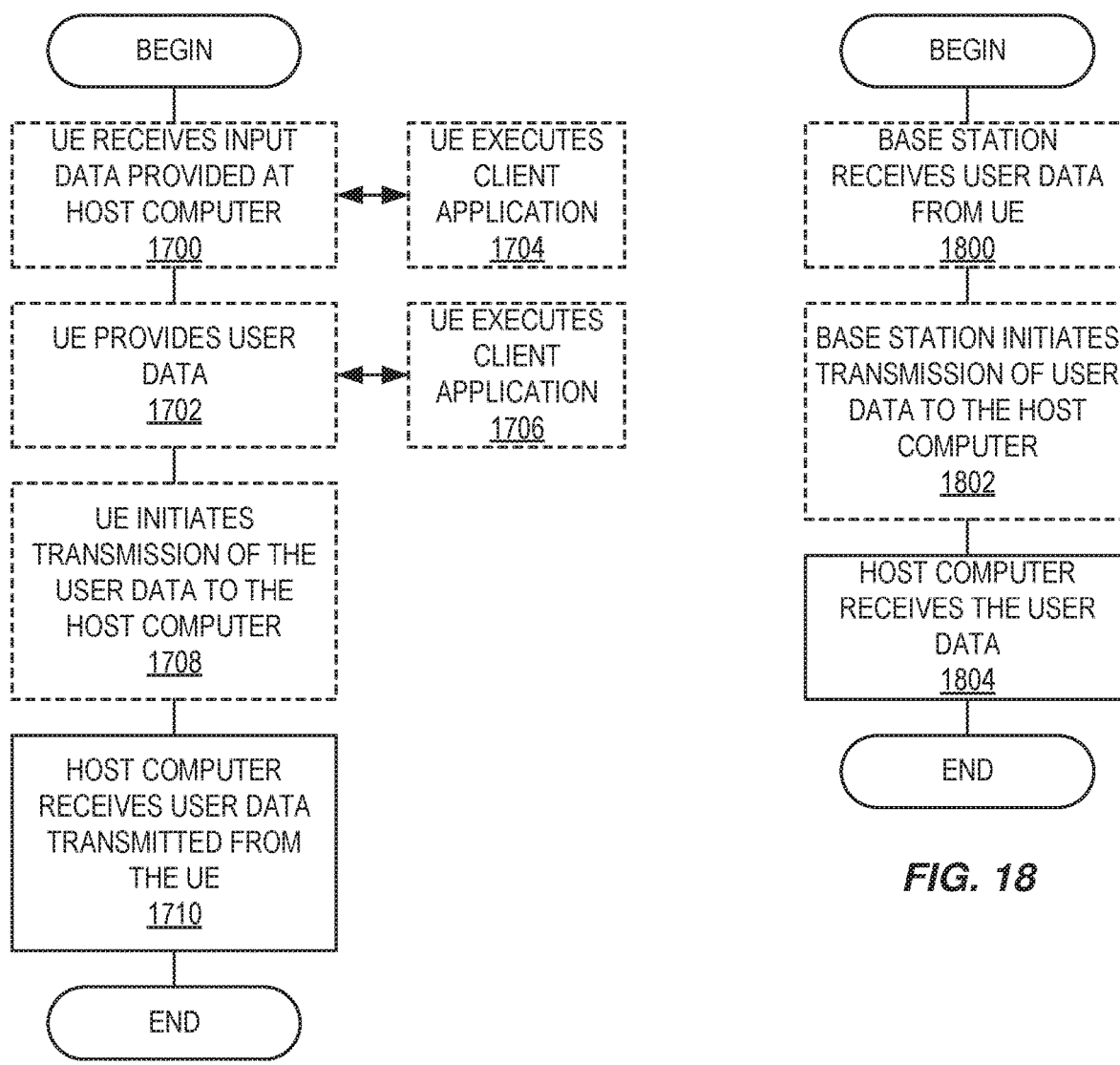

METHOD TO CONFIGURE THE MULTI-SLOT PUSCH FOR HALF DUPLEX SYSTEMS

RELATED APPLICATIONS

This application is a national phase application of International Patent Application No. PCT/IB2021/051214, filed Feb. 12, 2021, which claims the benefit of U.S. Provisional Patent App. No. 62/976,202, filed Feb. 13, 2020, and U.S. Provisional Patent App. No. 62/976,926, filed Feb. 14, 2020, the disclosures of which are hereby incorporated herein by reference in their entireties.

TECHNICAL FIELD

The present disclosure relates to multi-slot uplink transmission in a wireless network.

BACKGROUND

Third Generation Partnership Project (3GPP) specified Fifth Generation (5G), also called New Radio (NR), networks to meet demands for data centric applications. Below is the list of the requirements for 5G networks:
  Data rates of several tens of megabits per second should be supported for tens of thousands of users,
  1 gigabit per second to be offered simultaneously to tens of workers on the same office floor,
  Several hundreds of thousands of simultaneous connections to be supported for massive sensor deployments,
  Spectral efficiency should be significantly enhanced compared to Fourth Generation (4G),
  Coverage should be improved,
  Signaling efficiency should be enhanced, and
  Latency should be reduced significantly compared to Long Term Evolution (LTE).
From a service perspective, NR specification mainly supports the following services:
  Enhanced Mobile Broadband (eMBB): This is mainly for high broadband applications where the data rate is the main criteria.
  Ultra-Reliable Low-Latency Communication (URLLC): This is mainly for ultra-reliable communications where the packet error rate of $10^{-6}$ is required with less delay.
  Massive Machine Type Communication (mMTC): This is mainly for connecting machine type of communications, where the number of devices is main criteria.
Message Sequence Chart of Uplink Transmission FIG. 1 shows a typical message sequence chart for uplink data transfer in 5G systems. From the sounding reference signals, the NR base station (gNB) computes channel estimates and then determines parameters needed for Channel State Information (CSI) determination. The determination step includes, for example, computing channel quality indicator (modulation and coding scheme (MCS), Transmit precoding matrix index (TPMI), Transmit rank information (number of layers), and so on).

Once the gNB determines the parameters needed for scheduling uplink data, the gNB will communicate the determined parameters, which is also called downlink control channel (DCI) which is also referred to herein as Physical Downlink Control Channel (PDCCH) information, through a grant channel. Once a User Equipment (UE) receives the PDCCH information via the grant channel, the UE may transmit uplink data using a Physical Uplink Shared Channel (PUSCH).

Uplink Reference Signals:
  Uplink reference signals are predefined signals occupying specific resource elements within the uplink time-frequency grid. There are two types of uplink reference signals that are transmitted in different ways and used for different purposes by the gNB:
    Sounding Reference Signals (SRS): These reference signals are specifically intended to be used by the gNB to acquire Channel State Information (CSI) and beam specific information. In 5G systems, the SRS is UE specific so it can have a significantly lower time/frequency density.
    Demodulation Reference Signals (DM-RS): These reference signals are specifically intended to be used by the gNB for channel estimation for the data channel between the gNB and the UE. The label "UE-specific" relates to the fact that each demodulation reference signal is intended for channel estimation by the gNB from a specific UE. That specific reference signal is only transmitted within resource blocks assigned for data traffic channel transmission to the specific UE. Since the data traffic is typically precoded with a precoding, the DM-RS is also precoded with the same precoding as the data traffic.
Downlink Control Information (DCI):
  The Physical Downlink Control Channel (PDCCH) carries information, which is referred to as DCI, about the scheduling grants. Typically, this includes such information as number of Multiple Input Multiple Output (MIMO) layers scheduled, transport block sizes, modulation for each codeword, parameters related to Hybrid Automatic Repeat Request (HARQ), sub-band locations, etc. Note that, it may not be necessary for a DCI to include all the information mentioned above. In general, contents of the PDCCH (i.e., contents of the DCI) may depend on transmission mode and DCI format.
  The following information can be included in the DCI format:
    Carrier indicator
    Identifier for DCI formats
    Bandwidth part indicator
    Frequency domain resource assignment
    Time domain resource assignment
    Virtual Resource Block (VRB)-to-Physical Resource Block (PRB) mapping flag
    PRB bundling size indicator
    Rate matching indicator
    Zero Power (ZP) Channel State Reference Signal (CSI-RS) trigger
    Modulation and coding scheme for each Transport Block (TB)
    New data indicator for each TB
    Redundancy version for each TB
    HARQ process number
    Downlink Assignment Index
    Transmit Power Control (TPC) command for uplink control channel
    Physical Uplink Control Channel (PUCCH) resource indicator
    PDSCH-to-HARQ feedback timing indicator
    Antenna port(s)
    Transmission configuration indication
    SRS request
    Code Block Group (CBG) transmission information
    CBG flushing out information
    DM-RS sequence initialization Multi-Slot PUSCH Transmission To improve the coverage of PUSCH, 3GPP specification provides multi-slot configuration of PUSCH. When the UE is configured in multi-slot PUSCH configuration, the UE repeats a transport block(s) over multiple time slots as configured in the PUSCH configuration message. The network may configure 2, 4, or 8 multi-slots for the UE to repeat the transport block(s). In this regard, the network may use a single DCI to schedule the UE over multiple slots. Table 1 below provides Redundancy Version (RV) for each slot in a multi-slot configuration. If the network does not send the aggregationfactorUL, then the UE uses slot-based transmission for PUSCH transmission.

TABLE 1

Redundancy version for each slot in multi slot configuration

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

SUMMARY

Systems and methods are disclosed herein for transmission of multi-slot Physical Uplink Shared Channel (PUSCH) with repetitions in a half-duplex system (e.g., a Time Division Duplexing (TDD) system). In one embodiment, a method performed by a wireless device for transmission of multi-slot PUSCH repetitions in a half-duplex system comprises receiving, from a network node, information related to slot-based configuration in a plurality of slots or mini-slots in the half-duplex system and determining multiple consecutive uplink symbols in the plurality of slots or mini-slots based on the information received from the network node. The method further comprises transmitting PUSCH repetitions to the network node in the determined multiple consecutive uplink symbols in the plurality of slots or mini-slots. In this manner, realization of the gain associated with uplink multi-slot operation as in a full-duplex system is enabled in a half-duplex system.

In one embodiment, the received information comprises, for each slot or mini-slot of the plurality of slots or mini-slots, a downlink control information (DCI) received in the slot or mini-slot that indicates multiple consecutive symbols in the slot or mini-slot that are uplink symbols to be used by the wireless device for the PUSCH repetitions. Further, determining the multiple consecutive uplink symbols in the plurality of slots or mini-slots comprises determining the multiple consecutive uplink symbols in the plurality of slots or mini-slots based on the DCI received in each of the plurality of slots or mini-slots. In one embodiment, for each slot or mini-slot of the plurality of slots or mini-slots, the multiple consecutive symbols in the slot or mini-slot indicated by the DCI as uplink slots are remaining symbols in the slot or mini-slot that occur after a symbol in which the DCI was received. In one embodiment, for each slot or mini-slot of the plurality of slots or mini-slots, the DCI indicates a Hybrid Automatic Repeat Request (HARQ) process identity (ID), wherein the HARQ process ID is identical across the plurality of slots or mini-slots. In one embodiment, receiving the information comprises receiving identical or different DCIs in the plurality of slots/mini-slots. In one embodiment, for each slot or mini-slot in the plurality of slots or mini-slots, the DCI received in the slot or mini-slot comprises information that indicates a redundancy version (RV), wherein the RV can be identical or different across the plurality of slots or mini-slots.

In one embodiment, the received information comprises information that indicates a cell specific pattern and a wireless device specific pattern, each classifying an uplink symbol(s)-downlink symbol(s)-flexible symbol(s) pattern in a slot. Further, determining the multiple consecutive uplink symbols in each of the plurality of slots or mini-slots comprises determining a dedicated pattern for transmitting the PUSCH repetitions based on the cell specific pattern and the wireless device specific pattern. In one embodiment, the cell specific pattern comprises a pattern of downlink and flexible symbols, and the wireless device specific pattern comprises a pattern of downlink and uplink symbols. In one embodiment, the cell specific pattern is DDFFFFFFFFFFFF and the wireless device specific pattern is DDUUUUUUUUUUUU. In one embodiment, the cell specific pattern is indicated in a cell specific information element and the wireless device specific pattern is indicated in a wireless device specific information element. In one embodiment, determining the dedicated pattern comprises reconfiguring one or more flexible symbols in a slot as one or more uplink symbols, respectively, for transmitting the PUSCH repetitions. In one embodiment, transmitting the PUSCH repetitions comprises transmitting the PUSCH repetitions in the one or more flexible symbols in a slot with lower transmit power.

In one embodiment, the received information comprises a slot-based configuration received via radio resource control (RRC) signaling, where the slot-based configuration classifies all symbols in each of the plurality of slots or mini-slots as flexible symbols. The received information further comprises, for each slot or mini-slot, a slot format indicator (SFI) received via group common control channel, the SFI configured to reclassify some or all of the flexible symbols as classified in the slot-based configuration to uplink symbols, wherein the reclassified uplink symbols are used to transmit the PUSCH repetitions.

In one embodiment, the method further comprises postponing the PUSCH repetitions if any of the PUSCH repetitions cause conflict with a downlink symbol(s), downlink slot(s), or downlink mini-slot(s).

In one embodiment, determining the multiple consecutive uplink symbols further comprises reclassifying a flexible symbol(s) or slot(s) as an uplink symbol(s) or slot(s) for transmitting the PUSCH repetitions.

In one embodiment, the method further comprises performing a power measurement(s) in a neighboring network(s) during a pre-configured slot(s) for uplink transmissions and taking one of the following actions: transmit the PUSCH repetitions in the pre-configured slot(s) if the power measurement(s) indicates the power in the neighboring network(s) is below a threshold, and trigger scheduling of additional uplink slots or mini-slots to achieve a given data rate with higher reliability if the power measurement(s) indicates the power in the neighboring network(s) is above the threshold.

Corresponding embodiments of a wireless device are also disclosed. In one embodiment, a wireless device for transmission of multi-slot PUSCH repetitions in a half-duplex system is adapted to receive, from a network node, information related to slot-based configuration in a plurality of slots or mini-slots in the half-duplex system and determine multiple consecutive uplink symbols in the plurality of slots or mini-slots based on the information received from the network node. The wireless device is further adapted to transmit PUSCH repetitions to the network node in the determined multiple consecutive uplink symbols in the plurality of slots or mini-slots.

In one embodiment, a wireless device for transmission of multi-slot PUSCH repetitions in a half-duplex system comprises one or more transmitters, one or more receivers, and processing circuitry associated with the one or more transmitters and the one or more receivers. The processing circuitry is configured to cause the wireless device to receive, from a network node, information related to slot-based configuration in a plurality of slots or mini-slots in the half-duplex system and determine multiple consecutive uplink symbols in the plurality of slots or mini-slots based on the information received from the network node. The processing circuitry is further configured to cause the wireless device to transmit PUSCH repetitions to the network node in the determined multiple consecutive uplink symbols in the plurality of slots or mini-slots.

Embodiments of a method performed by a base station are also disclosed. In one embodiment, a method performed by a base station for configuring multi-slot PUSCH repetitions in a half-duplex system comprises providing information related to slot-based configuration in a plurality of slots or mini-slots in the half-duplex system to a wireless device and receiving (502) PUSCH repetitions from the wireless device in multiple consecutive uplink symbols in one or more of the plurality of slots or mini-slots, in accordance with the provided information.

In one embodiment, the provided information comprises, for each slot or mini-slot of the plurality of slots or mini-slots, a DCI provided in the slot or mini-slot that indicates multiple consecutive symbols in the slot or mini-slot that are uplink symbols to be used by the wireless device for the PUSCH repetitions. In one embodiment, for each slot or mini-slot of the plurality of slots or mini-slots, the multiple consecutive symbols in the slot or mini-slot indicated by the DCI as uplink slots are remaining symbols in the slot or mini-slot that occur after a symbol in which the DCI was received. In one embodiment, for each slot or mini-slot of the plurality of slots or mini-slots, the DCI indicates a HARQ process ID, wherein the HARQ process ID is identical across the plurality of slots or mini-slots. In one embodiment, providing the information comprises providing identical or different DCIs in the plurality of slots/mini-slots. In one embodiment, for each slot or mini-slot in the plurality of slots or mini-slots, the DCI provided in the slot or mini-slot comprises information that indicates a redundancy version, RV, wherein the RV can be identical or different across the plurality of slots or mini-slots.

In one embodiment, the provided information comprises information that indicates a cell specific pattern and a wireless device specific pattern, each classifying an uplink symbol(s)-downlink symbol(s)-flexible symbol(s) pattern in a slot, wherein a dedicated pattern for transmitting the PUSCH repetitions is based on the cell specific pattern and the wireless device specific pattern. In one embodiment, the cell specific pattern comprises a pattern of downlink and flexible symbols and the wireless device specific pattern comprises a pattern of downlink and uplink symbols. In one embodiment, the cell specific pattern is DDFFFFFFFFFFFFF and the wireless device specific pattern is DDUUUUUUUUUUUU. In one embodiment, the cell specific pattern is indicated in a cell specific information element and the wireless device specific pattern is indicated in a wireless device specific information element. In one embodiment, the dedicated pattern is based on reconfiguration of one or more flexible symbols in a slot as one or more uplink symbols, respectively, for transmitting the PUSCH repetitions.

In one embodiment, receiving the PUSCH repetitions comprises receiving the PUSCH repetitions in the one or more flexible symbols in a slot with lower transmit power.

In one embodiment, the provided information comprises a slot-based configuration provided via RRC signaling, where the slot-based configuration classifies all symbols in each of the plurality of slots or mini-slots as flexible symbols. The provided information further comprises, for each slot or mini-slot, a SFI provided via group common control channel, the SFI configured to reclassify some or all of the flexible symbols as classified in the slot-based configuration to uplink symbols, wherein the reclassified uplink symbols are used to transmit the PUSCH repetitions.

Corresponding embodiments of a base station are also disclosed. In one embodiment, a base station for configuring multi-slot PUSCH repetitions in a half-duplex system is adapted to provide information related to slot-based configuration in a plurality of slots or mini-slots in the half-duplex system to a wireless device and receive PUSCH repetitions from the wireless device in multiple consecutive uplink symbols in one or more of the plurality of slots or mini-slots, in accordance with the provided information.

In one embodiment, a base station for configuring multi-slot PUSCH repetitions in a half-duplex system comprises processing circuitry configured to cause the base station to provide information related to slot-based configuration in a plurality of slots or mini-slots in the half-duplex system to a wireless device and receive PUSCH repetitions from the wireless device in multiple consecutive uplink symbols in one or more of the plurality of slots or mini-slots, in accordance with the provided information.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15, 16, 17, and 18 are flow charts that illustrate example embodiments of methods implemented in a communication system such as that of FIG. 13.

DETAILED DESCRIPTION

Figure 1:
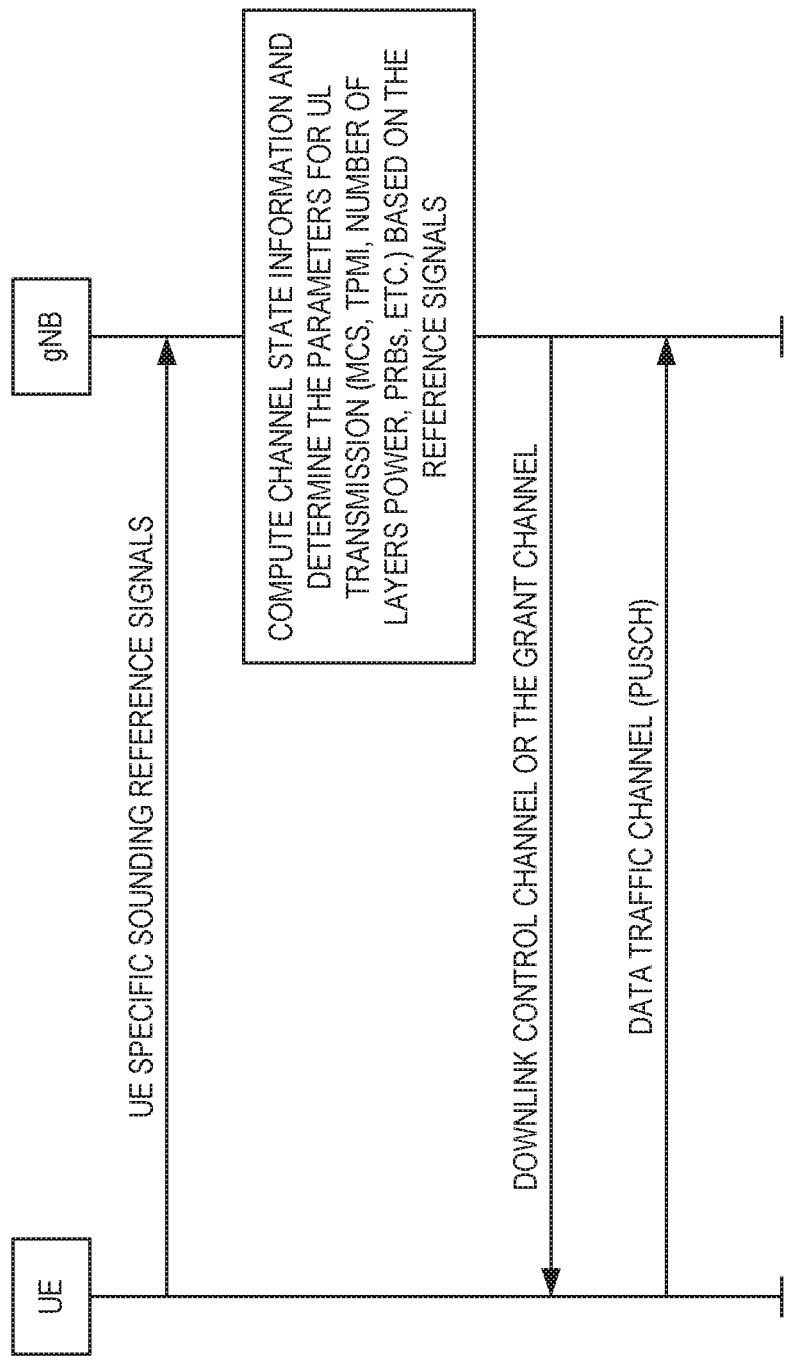
FIG. 1 shows a typical message sequence chart for uplink data transfer in Fifth Generation (5G) systems.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
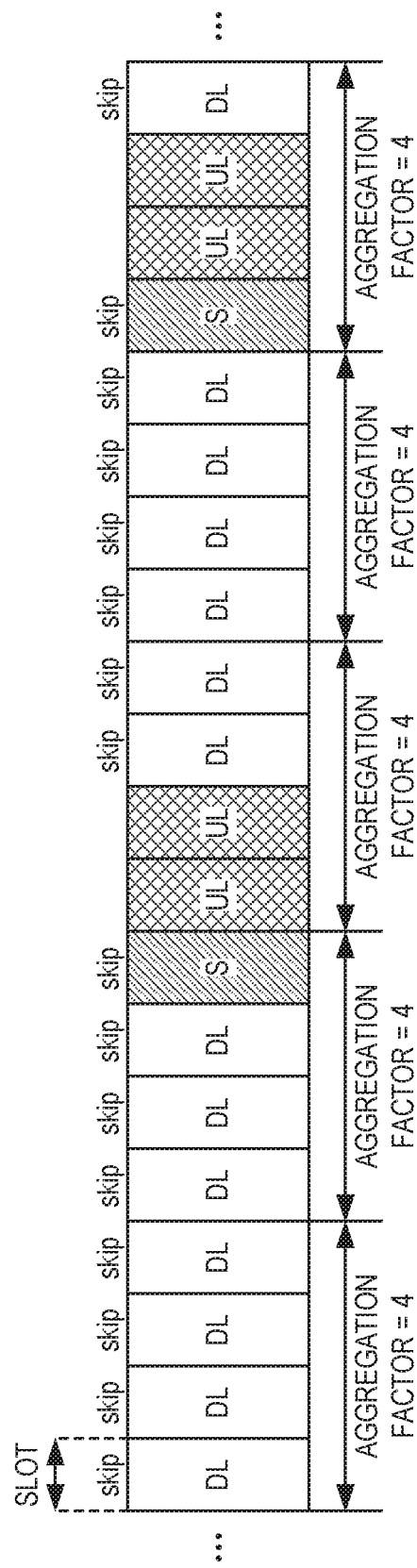
FIG. 2 illustrates a Time Division Duplexing (TDD) system having a 7 Downlink, 1 Special, and 2 Uplink (7D1S2U) slot configuration, and a User Equipment (UE) configured with multi-slot Aggregation Factor configuration of 4.

There currently exist certain challenge(s) with respect to multi-slot configuration in a cellular communication system such as a 5GS having a Next-Generation Radio Access Network (NG-RAN) that uses the NR radio access technology. It is well known that the multi-slot configuration may significantly improve coverage for the UE. Understandably, it may be straight forward to configure the UE to use the multi-slot configuration in a Frequency Division Duplexing (FDD) system since the downlink and uplink are separated by different frequencies. However, in a Time Division Duplexing (TDD) system where the downlink and uplink use the same frequency and share Orthogonal Frequency Division Multiplexing (OFDM) symbols, configuring the multi-slot configuration may not provide the same benefit as in the FDD system. As an example, FIG. 2 illustrates a TDD system having a 7 Downlink, 1 Special, and 2 Uplink (7D1S2U) slot configuration, and a UE configured with multi-slot Aggregation Factor configuration of 4.

The multi-slot configuration assumes the slots allocated for uplink are consecutive. However, with the 7D1S2U slot configuration in the TDD system, the UE can only transmit two consecutive uplink slots or a maximum of four non-consecutive uplink slots. In this regard, as the UE is configured with multi-slot Aggregation Factor configuration of 4, the UE may have to skip the transmission on downlink slots (in between uplink slots), thus diminishing the gains associated with the multi-slot configuration. This may in turn reduce NR coverage for the TDD system and make the multi-slot configuration unattractive in the TDD system.

Certain aspects of the present disclosure and their embodiments may provide solutions to the aforementioned or other challenges. In embodiments disclosed herein, a method for configuring the UE with multi-slot configuration in a TDD system are described. Specifically, the method can be implemented in a network node (e.g., a base station) and in a wireless device (e.g., a UE) to configure multi-slot PUSCH in a half-duplex system (e.g., TDD system). The method includes at least one or more of the following aspects:

Obtain information with respect to number of slots or mini-slots (also denoted herein as "slots/mini-slots") needed for successful transmission of the packet.
  Configure the UE with single-slot configuration, indicate in Downlink Control Information (DCI) of a slot(s) in which the uplink (UL) symbol configuration is provided, and schedule the UE for uplink transmission in each UL symbol with identical HARQ-process number and with identical or different Redundancy Version (RV)
  Configure the UE with multi-slot configuration along with semi-static signaling using cell-specific TDD-UL-DL-Common, UE-specific TDD-UL-DL-Configuration-Common, and Physical Uplink Shared Channel (PUSCH) aggregation Factor configurations
  Configure the UE with multi-slot configuration and provide a slot format indicator(s) using group common control channel to indicate symbol setting for the slots/mini-slots
  Transmit PUSCH either in one slot or multiple slots/mini-slots based on information obtained from Physical Downlink Control Channel (PDCCH) and Radio Resource Control (RRC) information
  Configure the UE to use initially assigned downlink (DL) slots/mini-slots for PUSCH repetitions with lower power, as indicated by the RRC information
  Obtain information about activity in neighboring networks (and possibly other cells of the own network) in close proximity to the UE
  Configure the UE to transmit PUSCH repetitions in certain slots/mini-slots as long as neighbor network (and possibly own network) activity close to the UE is lower than a certain threshold
  Signal between the UE and network node with respect to whether the PUSCH repetitions can be used and/or whether a different scheduling pattern is needed in case the PUSCH repetitions cannot be used Embodiments of the present disclosure enable realization of the gain associated with UL multi-slot operation (e.g., as in an FDD system) in a TDD system for enhanced Mobile Broadband (eMBB) and Ultra-Reliable Low-Latency Communication (URLLC) services. In embodiments discussed herein, the network node may use different methods, such as dynamic signaling for a scheduled device (e.g., UE), RRC Signaling, or combination of RRC Signaling and group common control signaling, to configure the UE for the UL multi-slot operation. This improves resource utilization and network performance, and at the same time facilitates the UL multi-slot operation to help improve coverage in the TDD system.

There are, proposed herein, various embodiments which address one or more of the issues disclosed herein.

In one aspect, a method performed by a wireless device for configuring multi-slot PUSCH repetitions in a half-duplex system (e.g., a TDD system) is provided. The method includes receiving from a network node (e.g., a base station) an instruction(s) comprising information (implicit or explicit) related to slot-based configuration in a plurality of slots/mini-slots in the half-duplex system. The method also includes determining multiple consecutive uplink symbols in one or more of the plurality of slots/mini-slots based on the instruction(s) received from the network node. The method also includes transmitting PUSCH repetitions to the network node in the determined multiple consecutive uplink symbols in the one or more of the plurality of slots/mini-slots. Note that, as used herein, a mini-slot is any number of consecutive uplink symbols within a slot.

In another aspect, a method performed by a base station for configuring multi-slot PUSCH repetitions in a half-duplex system (e.g., a TDD system) is provided. The method includes providing an instruction(s) comprising information (implicit or explicit) related to slot-based configuration in a plurality of slots/mini-slots in the half-duplex system to a wireless device (e.g., a UE). The method also includes receiving PUSCH repetitions from the wireless device in multiple consecutive uplink symbols in one or more of the plurality of slots/mini-slots.

Certain embodiments may provide one or more of the following technical advantage(s). The proposed solution allows for better utilization of network resources by adapting network configuration and reconfiguration of the number of slots/mini-slots. Hence the overall network performance is improved at the same time facilitating the UL multi-slot operation to improve coverage in the TDD system, especially in such environment where the TDD system can be easily deployed. In addition, the network node may reduce downlink control signaling. As a result, the network may use control channel resources as data channel, thus helping to improve downlink throughput.

Figure 3:
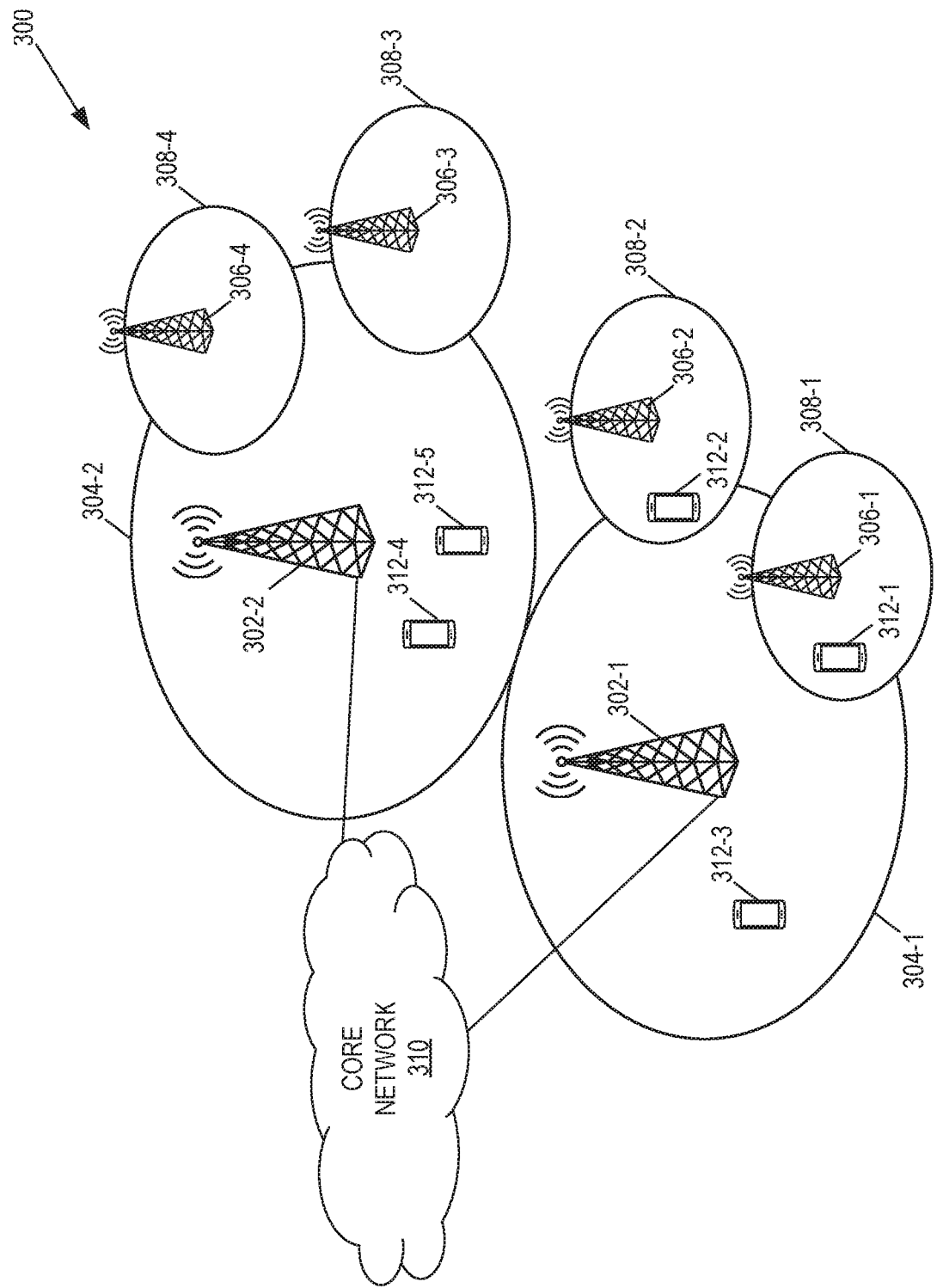
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a NR RAN. In this example, the RAN includes base stations 302-1 and 302-2, which in 5G NR are referred to as gNBs (i.e., NR base stations connected to 5GC) or ng-eNBs (e.g., LTE RAN nodes connected to 5GC), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs and as such sometimes referred to herein as UEs 312, but the present disclosure is not limited thereto.

In some embodiments, the non-limiting term of radio network node or simply network node is used to refer to any type of network node that serves UE and/or connected to other network node, network element, or any radio node from where a UE receives signal. Examples of radio network nodes can include Node B, base station (BS), multi-standard radio (MSR) node such as MSR BS, gNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term UE is used to refer to any type of wireless device that communicates with a radio network node in a cellular or mobile communication system. Examples of the UE can include target device, device to device (D2D) UE, machine type UE or UE capable of machine to machine (M2M) communication, PDA, iPad, Tablet, mobile terminals, smart phone, laptop embedded equipped (LEE), laptop mounted equipment (LME), USB dongles, etc.

Although the embodiments are described herein for NR, it should be appreciated that these embodiments are also applicable to any RAT or multi-RAT system, wherein the UE operates using multiple carriers (e.g., LTE FDD/TDD, GSM/GERAN, Wi Fi, WLAN, WiMax, CDMA2000, etc.).

The embodiments disclosed herein may be applicable to single carrier as well as to multicarrier (MC) or carrier aggregation (CA) operation of the UE. The term carrier aggregation (CA) can be used interchangeably to refer to "multi-carrier system", "multi-cell operation", "multi-carrier operation", "multi-carrier" transmission and/or reception.

The embodiments disclosed herein may also be applicable to for transmission from multiple transmission reception points also called multiple TRPs.

As described in detail below, three embodiments, which may be employed independently or in combination, for facilitating the multi-slot operation of NR PUSCH are disclosed. Notably, the embodiments are discussed herein based on an assumption that the network node has obtained information about the UE and has already determined the number of slots/mini-slots the UE needs to repeat for the multi-slot operation of NR PUSCH (also referred to as "UL multi-slot operation," "UL multi-slot configuration," "PUSCH multi-slot operation," and "PUSCH multi-slot configuration").

Figure 4:
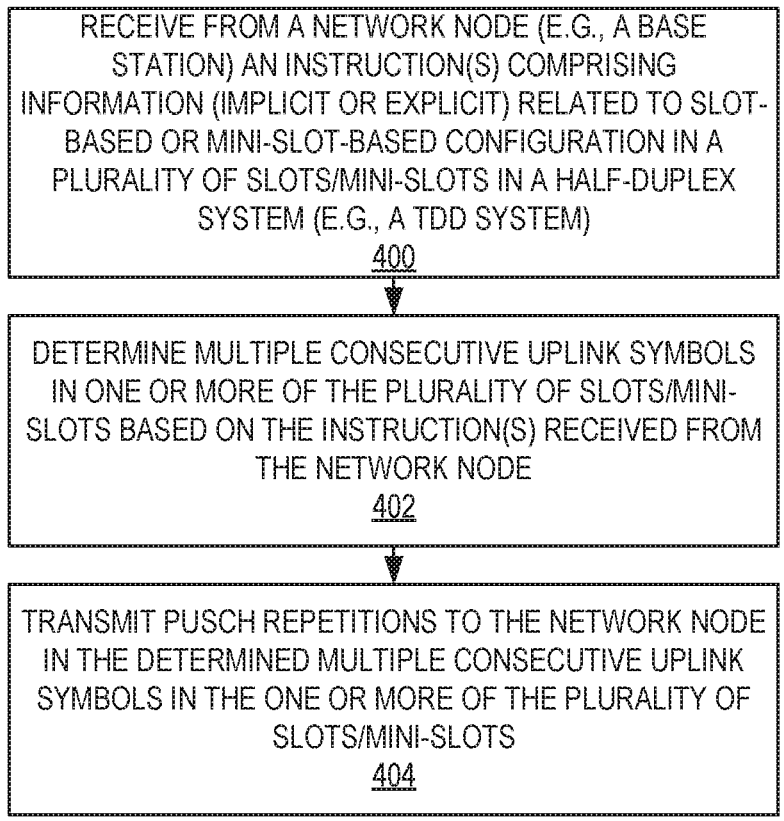
FIG. 4 is a flowchart of an exemplary method performed by a wireless device for configuring multi-slot Physical Uplink Shared Channel (PUSCH) repetitions in a half-duplex system (e.g., a TDD system) is provided.

FIG. 4 is a flowchart of an exemplary method performed by a wireless device 312 for configuring multi-slot PUSCH repetitions in a half-duplex system (e.g., a TDD system) is provided. The method includes receiving from a network node (e.g., a base station 302) an instruction(s) comprising information (implicit or explicit) related to slot-based configuration in a plurality of slots/mini-slots in the half-duplex system (step 400). The method also includes determining multiple consecutive uplink symbols in one or more of the plurality of slots/mini-slots based on the instruction(s) received from the network node (step 402). The method also includes transmitting PUSCH repetitions to the network node in the determined multiple consecutive uplink symbols in the one or more of the plurality of slots/mini-slots (step 404). Additional details related to steps 400-404 are provided in the embodiments described below. However, as described above, some aspects related to steps 400-404 may include any one or more of the following:

In step 400, the network node may configure the wireless device 312 with single-slot configuration, indicate in DCI a slot(s) in which the UL symbol configuration is provided, and schedule the UE for uplink transmission in each UL symbol with identical HARQ-process number and with identical RV or different RVs.

In step 400, the network node may configure the wireless device 312 with multi-slot configuration along with semi-static signaling using cell-specific TDD-UL-DL-Common, UE-specific TDD-UL-DL-Configuration-Common, and PUSCH aggregation Factor configurations.

In step 400, the network node may configure the wireless device 312 with multi-slot configuration and provide a slot format indicator(s) using group common control channel to indicate symbol setting for the slots/mini-slots.

In step 404, the wireless device 312 may transmit PUSCH either in one slot or multiple slots/mini-slots based on information (e.g., the instructions of step 400) obtained from PDCCH and RRC information.

In step 400, the network node may configure the wireless device 312 to use initially assigned DL slots/mini-slots for PUSCH repetitions with lower power, as indicated by the RRC information.

The wireless device 312 may obtain information about activity in neighboring networks (and possibly other cells of the own network) in close proximity to the wireless device 312.

In step 400, the network node may configure the wireless device 312 to transmit PUSCH repetitions in certain slots/mini-slots as long as neighbor network (and possibly own network) activity close to the wireless device 312 is lower than a certain threshold.

Signaling may be used between the wireless device 312 and the network node with respect to whether the PUSCH repetitions can be used and/or whether a different scheduling pattern is needed in case the PUSCH repetitions cannot be used.

Figure 5:
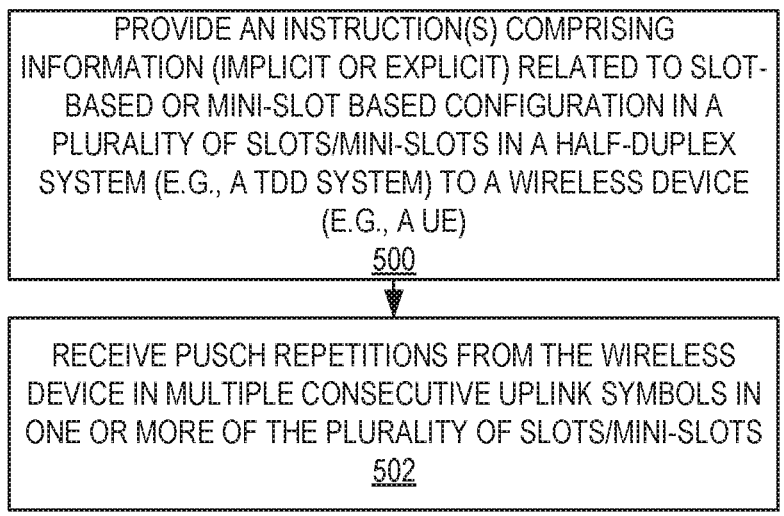
FIG. 5 is a flowchart of an exemplary method performed by a base station for configuring multi-slot PUSCH repetitions in a half-duplex system (e.g., a TDD system) is provided.

FIG. 5 is a flowchart of an exemplary method performed by a base station for configuring multi-slot PUSCH repetitions in a half-duplex system (e.g., a TDD system) is provided. The method includes providing an instruction(s) comprising information (implicit or explicit) related to slot-based configuration in a plurality of slots/mini-slots in the half-duplex system to a wireless device (e.g., a UE) (step 500). The method also includes receiving PUSCH repetitions from the wireless device in multiple consecutive uplink symbols in one or more of the plurality of slots/mini-slots (step 502). Additional details related to steps 500-502 are provided in the embodiments described below. However, as described above, some aspects related to steps 500 and 502 may include any one or more of the following:

- The base station may obtain information with respect to number of slots/mini-slots needed for successful transmission of the packet.
- In step 500, the base station may configure the wireless device 312 with single-slot configuration, indicate in DCI a slot(s) in which the UL symbol configuration is provided, and schedule the UE for uplink transmission in each UL symbol with identical HARQ-process number and with identical RV or different RVs.
- In step 500, the base station may configure the wireless device 312 with multi-slot configuration along with semi-static signaling using cell-specific TDD-UL-DL-Common, UE-specific TDD-UL-DL-Configuration-Common, and PUSCH aggregation Factor configurations.
- In step 500, the base station may configure the wireless device 312 with multi-slot configuration and provide a slot format indicator(s) using group common control channel to indicate symbol setting for the slots/mini-slots.
- In step 502, the base station may receive PUSCH from the wireless device 312 either in one slot or multiple slots/mini-slots based on information provided to the wireless device 312 (e.g., instruction(s) provided to the wireless device 312) via PDCCH and RRC information.
- In step 500, the base station may configure the wireless device 312 to use initially assigned DL slots/mini-slots for PUSCH repetitions with lower power, as indicated by the RRC information.
- The wireless device 312 may obtain information about activity in neighboring networks (and possibly other cells of the own network) in close proximity to the wireless device 312.
- In step 500, the base station may configure the wireless device 312 to transmit PUSCH repetitions in certain slots/mini-slots as long as neighbor network (and possibly own network) activity close to the wireless device 312 is lower than a certain threshold.
- Signaling between the wireless device 312 and the base station may be used with respect to whether the PUSCH repetitions can be used and/or whether a different scheduling pattern is needed in case the PUSCH repetitions cannot be used.

Specific embodiments related to the method as illustrated in FIGS. 4 and 5 are discussed in detail below.

Using Dynamic Signaling for the Scheduled Device

In this embodiment, the network node (e.g., base station 302 or radio access node that implements all or part of the functionality of the base station 302) implies a slot-based configuration without sending the aggregationfactorUL. Nevertheless, the UL multi-slot operation can still be enabled even with the slot-based configuration.

The UE (e.g., UE 312) monitors control signaling in the downlink and transmits/receives according to the received scheduling grants/assignments. A UE in the TDD system (also referred to as "a TDD UE") typically sees each OFDM symbol in a slot as a downlink symbol unless the UE is otherwise instructed to transmit in the uplink. In this regard, the network node can send a downlink control channel in the first 1 or 2 OFDM symbols in each slot to indicate to the UE that the UE is to transmit in the PUSCH in the remaining slots with a HARQ-Process ID. Similarly, in a subsequent slot, the network node may again send a downlink control channel to indicate to the UE to transmit PUSCH with the same HARQ-Process ID as used in the previous slot. In a non-limiting example, it is possible to use DCI to provide indication to the UE to use the same HARQ-Process ID in the subsequent slot.

Figure 6:
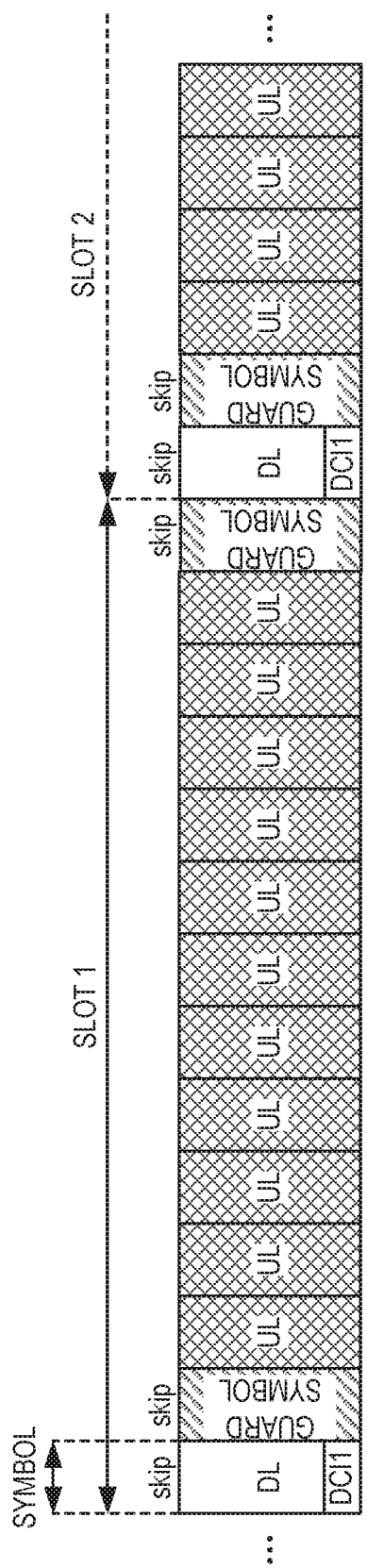
FIG. 6 provides an exemplary illustration of symbol setting within a slot for uplink (UL) multi-slot configuration in a TDD system.

FIG. 6 provides an exemplary illustration of symbol setting within a slot for UL multi-slot configuration in a TDD system. As illustrated in FIG. 6, the first symbol is a DL symbol used to provide the DCI indication that indicates a start and an end of PUSCH symbols (e.g., between the 3rd and the 13th symbol) in the slot. The guard symbols (e.g., the 14th symbol) may be different for each slot. The DCIs may be identical or different for each slot.

The RV can also be indicated in each DCI. In one embodiment, the network node sends the RV as that in Table 1. In another embodiment, the RV is same in each slot. The network node may repeat the multi-slot configuration for N consecutive slots, where N is the number of multi-slots the network node has determined for that particular UE.

Figure 7:
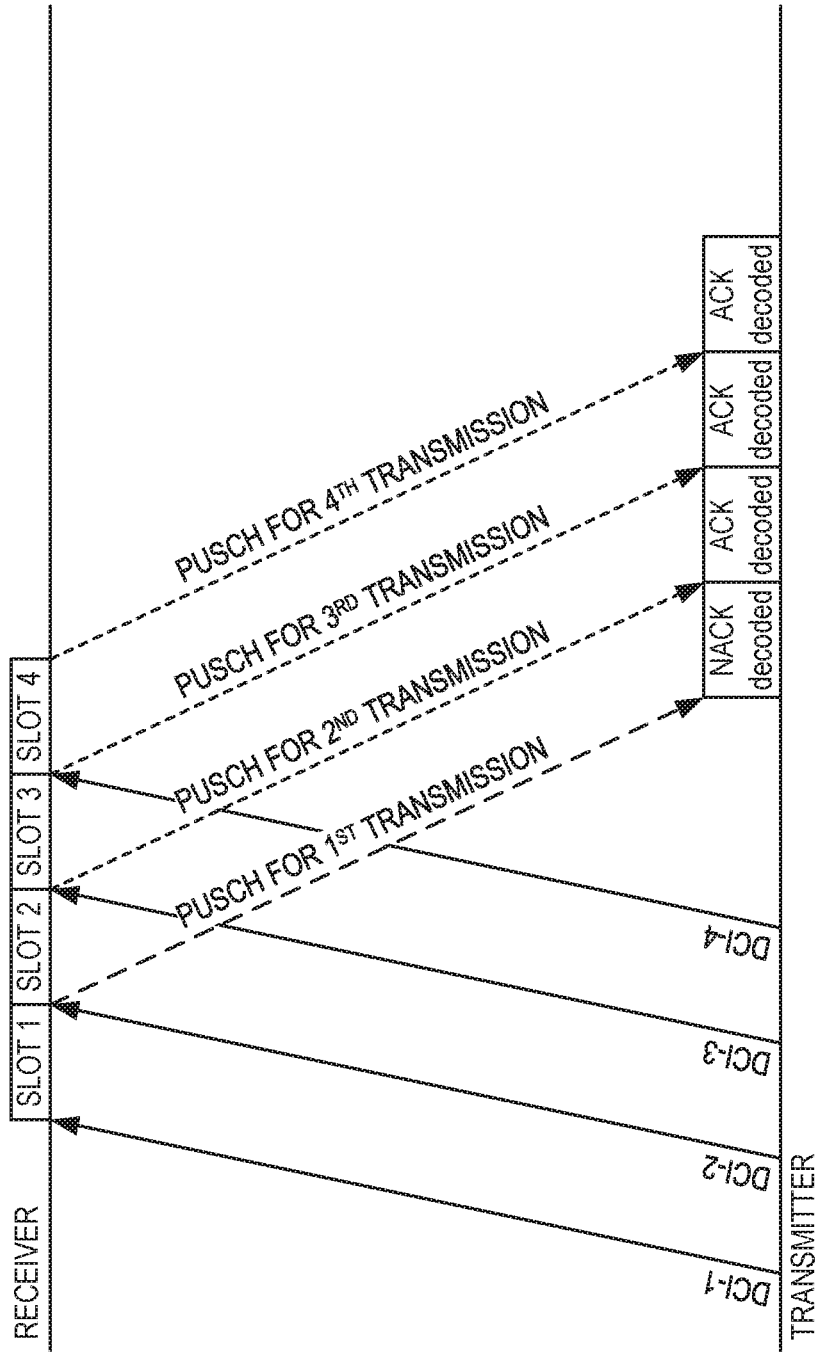
FIG. 7 provides an exemplary illustration of the multi-slot configuration performed by the network node.

FIG. 7 provides an exemplary illustration of the multi-slot configuration performed by the network node. As illustrated in FIG. 7, the transmitter (i.e., the network node) transmits a first DCI (DCI-1) that indicates a start of PUSCH symbols for a PUSCH for a first transmission in a first slot (Slot 1), a second DCI (DCI-2) that indicates a start of PUSCH symbols for a PUSCH for a second transmission in a second slot (Slot 2), a third DCI (DCI-3) that indicates a start of PUSCH symbols for a PUSCH for a third transmission in a third slot (Slot 3), and a fourth DCI (DCI-4) that indicates a start of PUSCH symbols for a PUSCH for a fourth transmission in a fourth slot (Slot 4). In this example, the network node repeats the multi-slot configuration for 4 consecutive slots (N=4). It should be appreciated that the same principle is applicable to any value of N.

Signaling

In this embodiment, the network node (e.g., base station 302 or radio access node that implements all or part of the functionality of the base station 302) sends the slot configuration using RRC signaling. Accordingly, the network node can provide the multi-slot configuration to the specific UE (e.g., 312) at the same time without impacting the other UE transmission. In this regard, the multi-slot operation can be configured via semi-static signaling of the slot information.

The RRC-signaled pattern classifies OFDM symbols as "downlink," "flexible," or "uplink." For a UE operating in the TDD system, a symbol classified as "downlink" is used exclusively for downlink transmission with no uplink transmission in the same frame period. Similarly, a symbol classified as "uplink" means that the UE should not expect any overlapping downlink transmission. "Flexible" means that the UE cannot make any assumptions on the transmission direction. Instead, the UE should monitor downlink control signaling and transmit/receive accordingly if a scheduling message is available.

The RRC-signaled pattern is expressed as a concatenation of up to two sequences of downlink_flexible_uplink, which can occupy a configurable period between 0.5 ms and 10 ms. The network node may configure two patterns, namely a cell-specific TDD-UL-DLCommon provided as part of system information and a UE-specific TDD-UL-DL-ConfigurationCommon provided in TDD-UL-DL-ConfigDedicated. Based on the TDD-UL-DLCommon and the TDD-UL-DL-ConfigurationCommon, it may be possible to generate a dedicated pattern that restricts the "flexible" symbols signaled in the cell-specific TDD-UL-DLCommon to be "uplink" symbols for the multi-slot configuration with any N value.

In this regard, the UE may assume that, if an RRC signaled pattern includes slots usually used for downlink, the UE may use those slots for PUSCH repetitions (but not for new data) and may potentially use a lower transmit (TX) power to reduce the UL interference.

Using Combination of RRC Signaling and Group Common Control Signaling

In this embodiment, the network node (e.g., base station 302 or radio access node that implements all or part of the functionality of the base station 302) sends the slot configuration using the RRC signaling to classify the symbols as "flexible" and uses group common control channel to provide a slot format indicator (SFI) dynamically. The slot format indicator, which may be valid for one or more slots, can indicate the number of OFDM symbols that are classified as "downlink," "flexible," or "uplink" in each slot.

The SFI indicator may be received by a configured group of one or more UEs and can be viewed as a pointer into an RRC-configured table, wherein each row is constructed from a set of predefined downlink/flexible/uplink patterns in one slot duration. The network node may send the RRC signaling of the symbols in a slot format. For example, the network node can send DDFFFFFFFFFFFF in the common RRC configuration, wherein 'D' represents "downlink" and 'F' represents "flexible." The network node may then use group common control channel to change the 'F' to 'U' for "uplink," thereby facilitating the UL multi-slot operation. In this regard, the UE may assume that, if UL operation in 'F' slots is signaled, the UE may send PUSCH repetitions in the 'F' slots, and may potentially use a lower TX power to reduce the UL interference.

Using Pre-Defined Rules

In this embodiment, the UE (e.g., UE 312) is required to postpone PUSCH repetitions if the network node has configured the multi-slot operation and a PUSCH repetition clashes with a DL slot.

Figure 19:
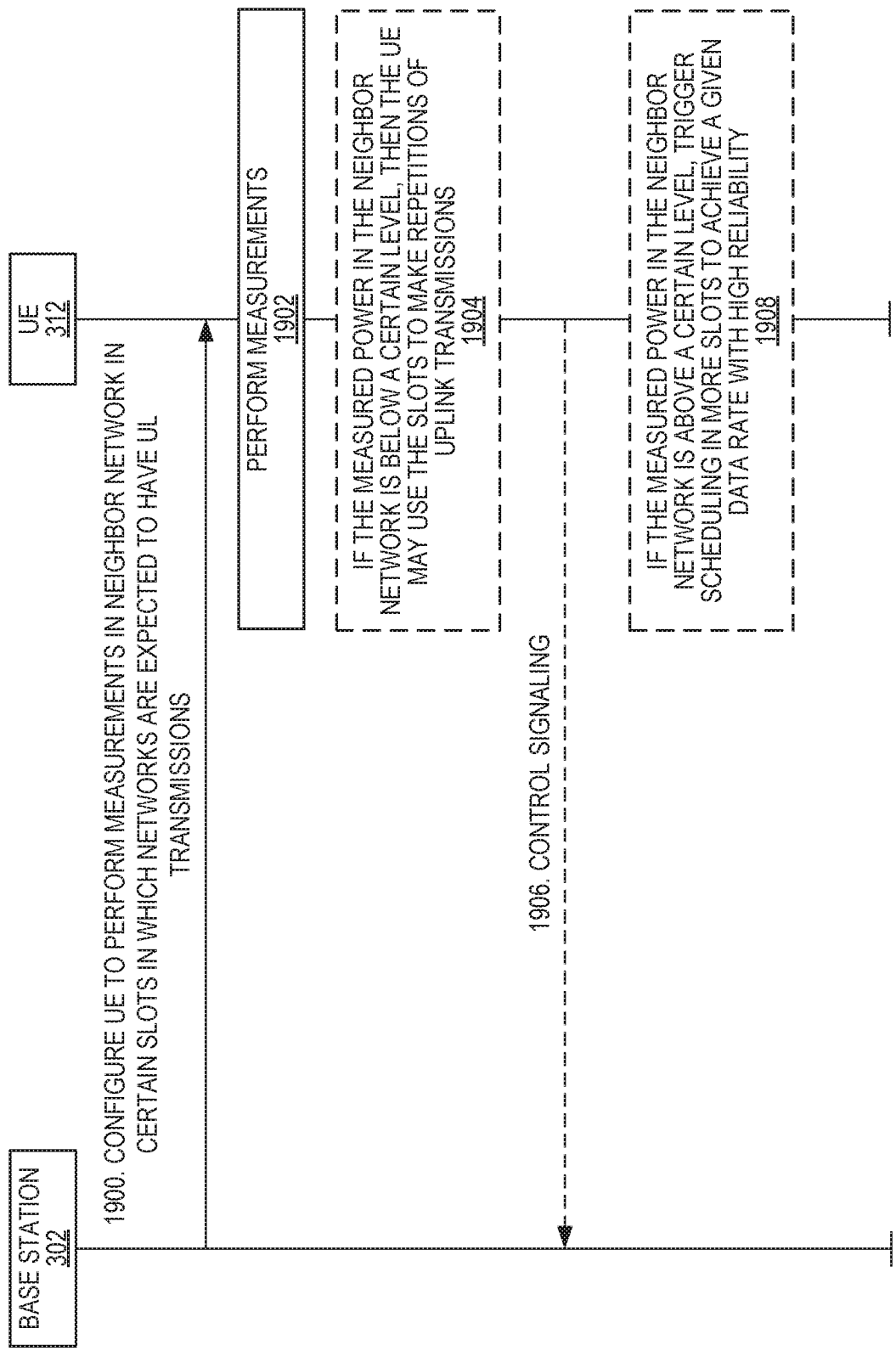
FIG. 19 illustrates the operation of a network node and a wireless device in accordance with another embodiment of the present disclosure.

In another embodiment, the UE may interpret an already configured DL slot(s) as an UL slot(s) as indicated by the group common signaling if the network node has configured the UE with the multi-slot configuration and group common signaling, Using Neighbor Network Measurements As illustrated in FIG. 19, in another embodiment, the network node (e.g., base station 302 or radio access node that implements all or part of the functionality of the base station 302) configures the UE (e.g., UE 312) to make power measurement in neighbor networks in certain pre-configured slots, during which both networks are expected to transmit uplink (step 1902). The time period over which such measurements should be made may be short or longer term. The UE performs measurements accordingly (step 1902). Lack of measured power from neighbor networks may indicate that the UE is not in proximity of neighbor network. In this regard, the UE would need to receive downlink during a second set of preconfigured slots, during which the UE may make additional repetitions of uplink transmissions. If the measured power in the neighbor network is below a certain level, then the UE may use the slots to make repetitions of uplink transmissions (step 1904). Control signaling from the UE to the network node may be devised to indicate whether such repetitions are made (step 1906). If the measured power is above the threshold, then the UE may need to be scheduled in more slots to achieve a given data rate with high reliability (step 1908). Control signaling may also indicate that repetitions are not available and further scheduling is needed.

Additional Aspects

Figure 8:
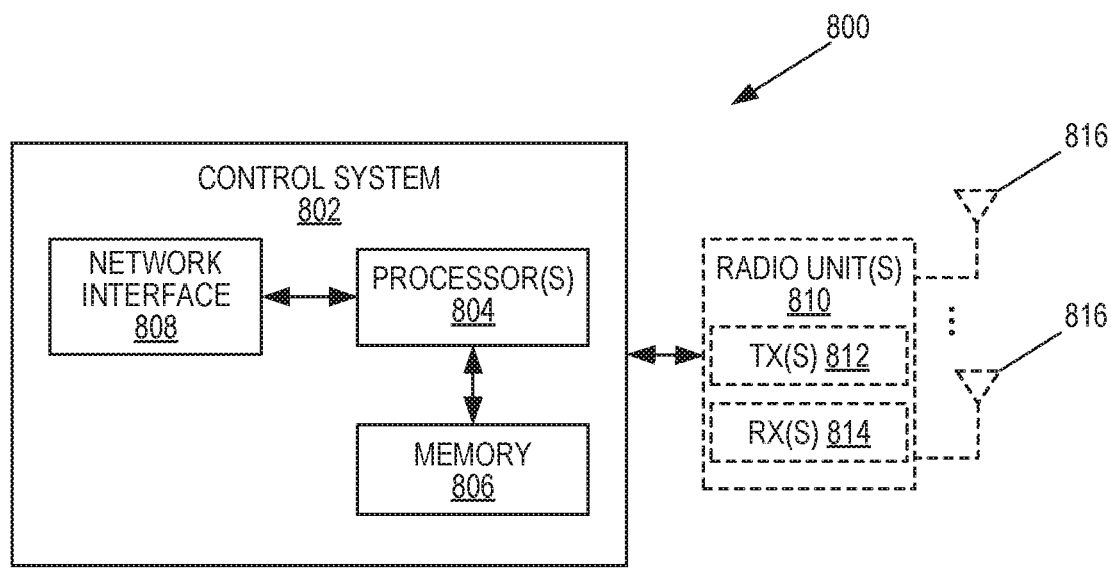
FIGS. 8, 9, and 10 are schematic block diagrams of example embodiments of a radio access node.

FIG. 8 is a schematic block diagram of a radio access node 800 according to some embodiments of the present disclosure. Optional features are represented by dashed boxes. The radio access node 800 may be, for example, a base station 302 or 306 or a network node that implements all or part of the functionality of the base station 302 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein (e.g., one or more functions of a network node as described with reference to FIG. 5). In some embodiments, the function(s) are implemented in software that is stored, e.g., in the memory 806 and executed by the one or more processors 804.

Figure 9:
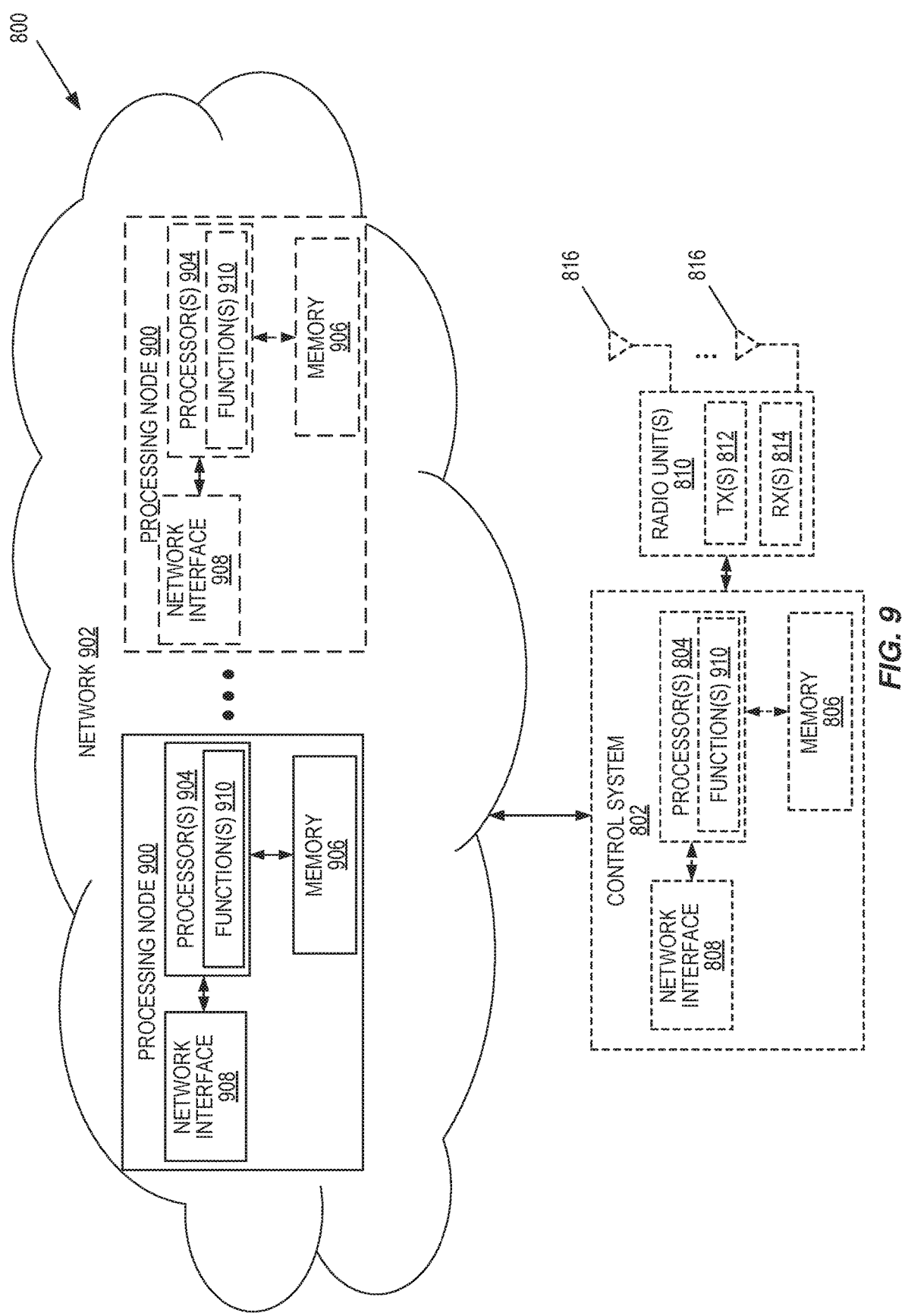

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902.

If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein (e.g., one or more functions of a network node as described with reference to FIG. 5) are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein (e.g., one or more functions of a network node as described with reference to FIG. 5) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
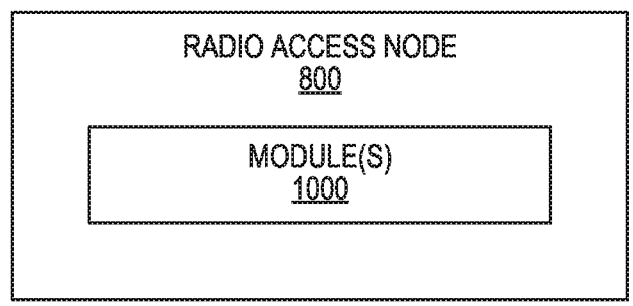

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of a network node as described with reference to FIG. 5). This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
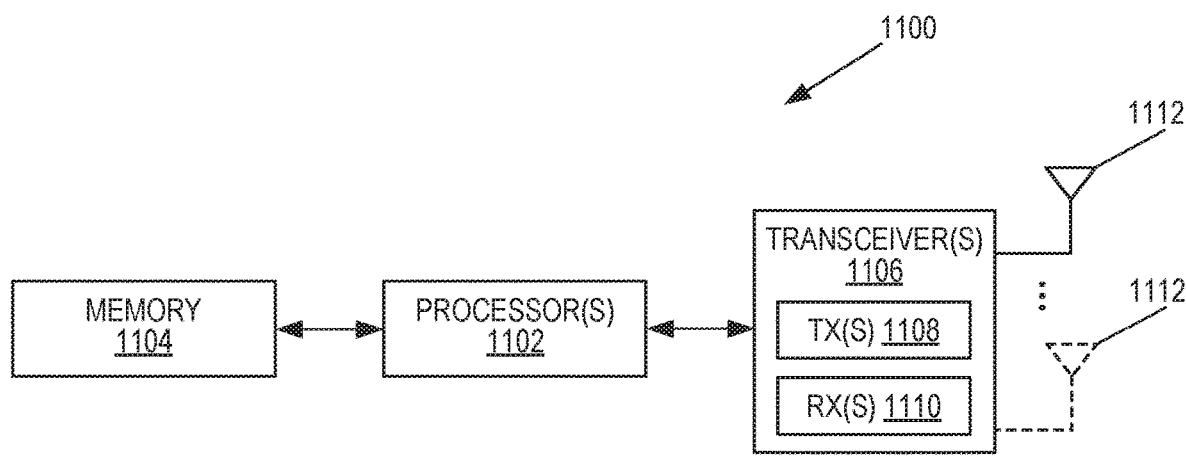
FIGS. 11 and 12 are schematic block diagrams of example embodiments of a wireless device.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAS, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of a network node as described with reference to FIG. 5) may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein (e.g., one or more functions of a network node as described with reference to FIG. 5) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
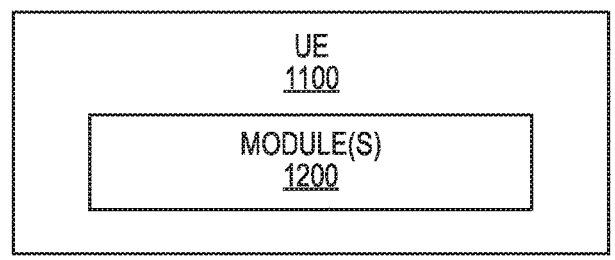

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein (e.g., one or more functions of a network node as described with reference to FIG. 5).

Figure 13:
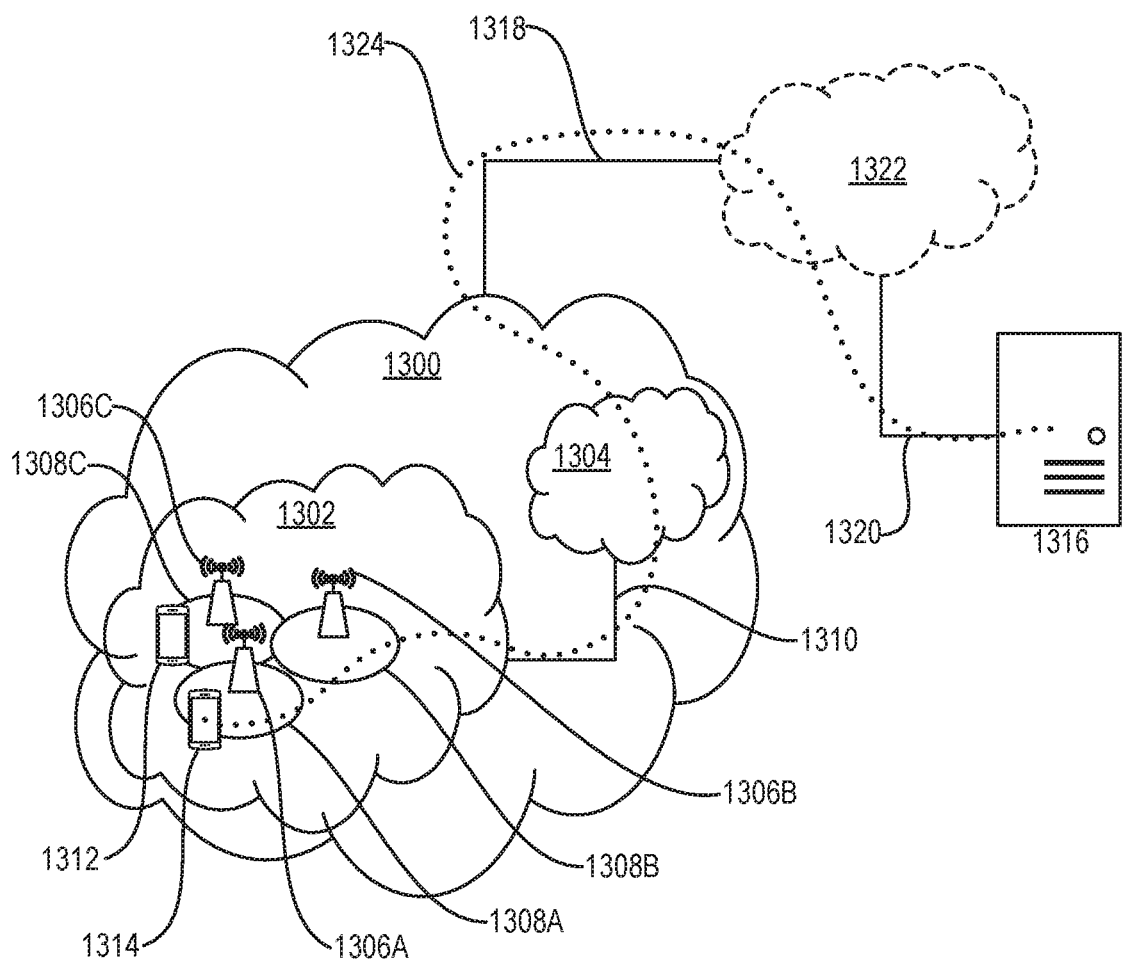
FIG. 13 illustrates an example embodiment of a communication system in which embodiments of the present disclosure may be implemented.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
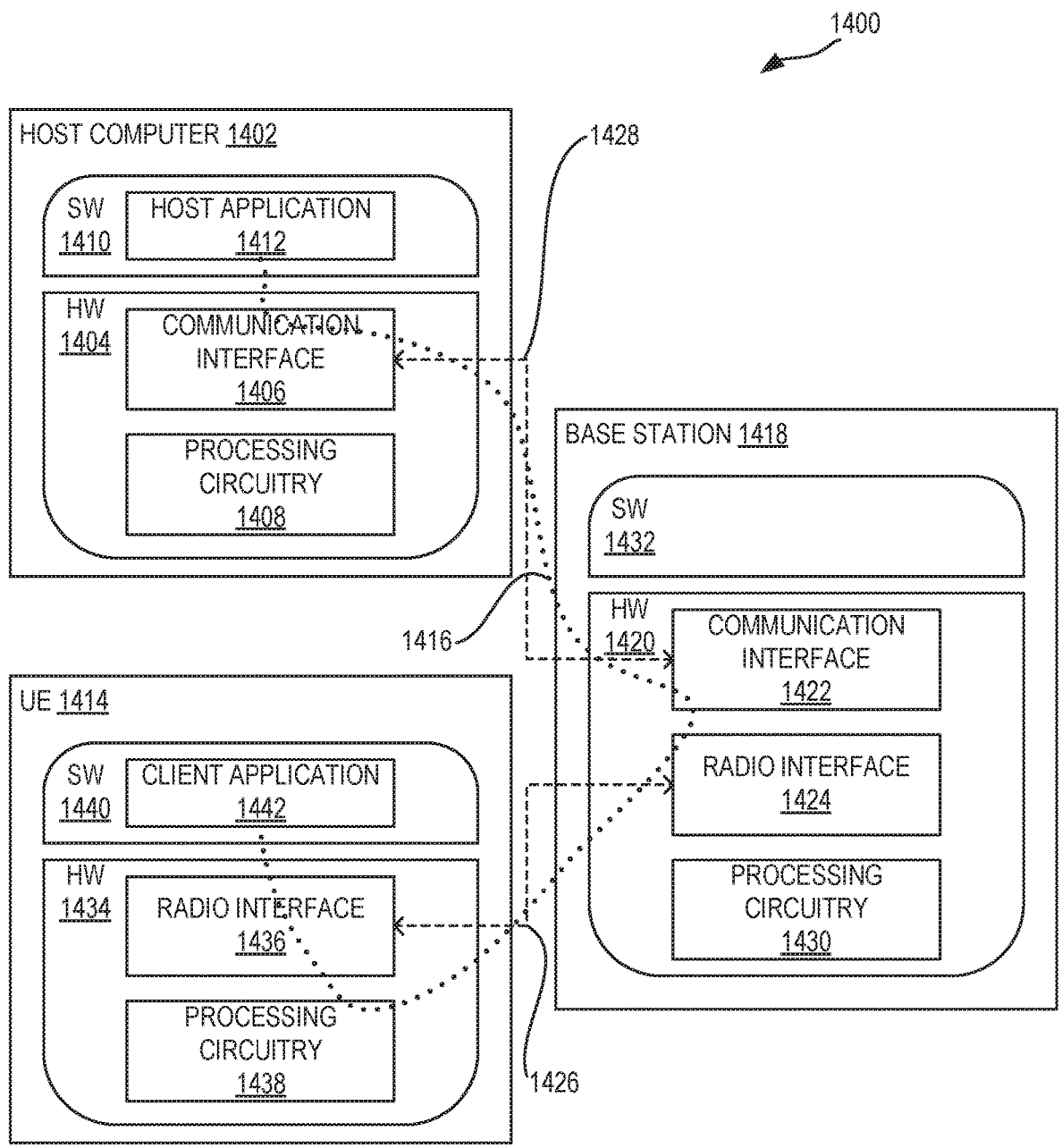
FIG. 14 illustrates example embodiments of the host computer, base station, and UE of FIG. 13.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve the network resource utilization and overall network performance and thereby provide benefits such as more reliable uplink multi-slot operation for improving coverage.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

Figure 15:
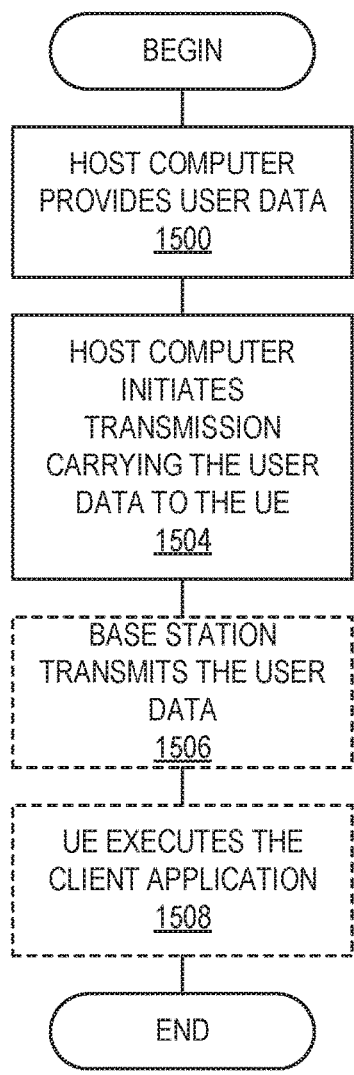

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

Figure 16:
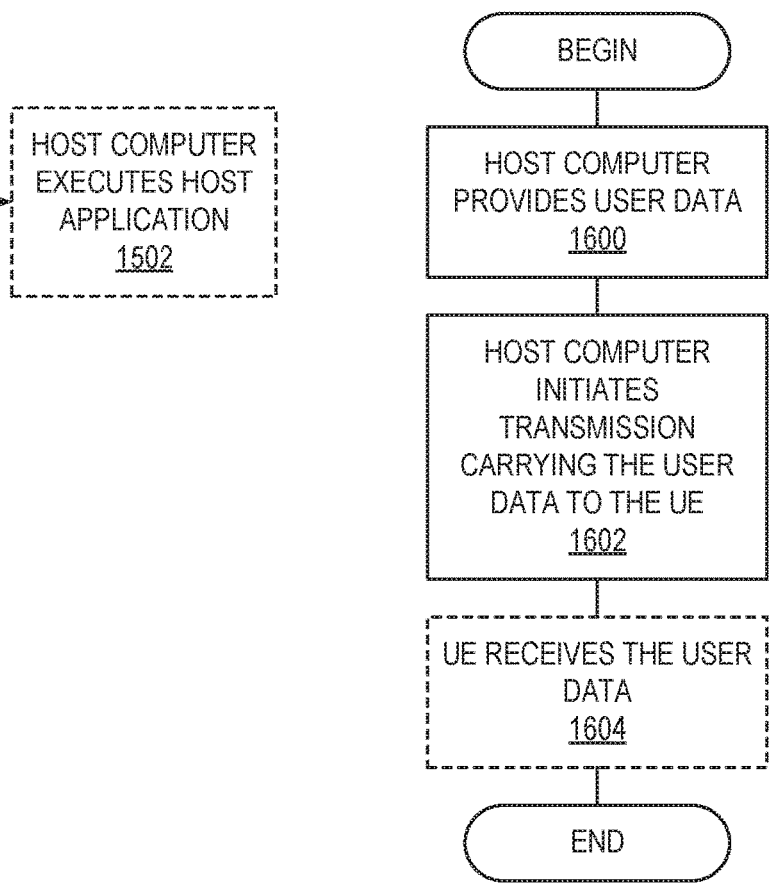

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for configuring multi-slot PUSCH repetitions in a half-duplex system (e.g., a TDD system), the method comprising: receiving (400) from a network node (e.g., a base station) an instruction(s) (e.g., implicit or explicit instruction(s)) comprising information (implicit or explicit) related to slot-based configuration in a plurality of slots/mini-slots in the half-duplex system; determining (402) multiple consecutive uplink symbols in one or more of the plurality of slots/mini-slots based on the instruction(s) received from the network node; and transmitting (404) PUSCH repetitions to the network node in the determined multiple consecutive uplink symbols in the one or more of the plurality of slots/mini-slots.

Embodiment 2: The method of embodiment 1, wherein: the instruction(s) comprise implicit information related to the slot-based configuration in the plurality of slots/mini-slots in the half-duplex system; and determining the multiple consecutive uplink symbols in the one or more of the plurality of slots/mini-slots comprises determining the multiple consecutive uplink symbols in the one or more of the plurality of slots/mini-slots based on the implicit information received from the network node.

Embodiment 3: The method of any of the previous embodiments, wherein: determining the multiple consecutive uplink symbols in the one or more of the plurality of slots/mini-slots based on the implicit information comprises receiving a downlink control information (DCI) in a starting symbol(s) (e.g., $1^{st}$ or $2^{nd}$ symbols) in each of the plurality of slots/mini-slots, the DCI configured to instruct the UE to transmit the PUSCH repetitions in remaining symbols subsequent to the starting symbol(s) in each of the plurality of slots/mini-slots and configured to indicate to the UE a number of PUSCH symbols to be included in the repetitions; and transmitting the PUSCH repetitions comprises transmitting the PUSCH repetitions in the remaining symbols in each of the plurality of slots/mini-slots.

Embodiment 4: The method of any of the previous embodiments, wherein transmitting the PUSCH repetitions comprises transmitting the PUSCH repetitions in each of the plurality of slots/mini-slots with identical HARQ Process ID.

Embodiment 5: The method of any of the previous embodiments, wherein receiving the instruction(s) comprises receiving identical or different DCIs in the plurality of slots/mini-slots.

Embodiment 6: The method of any of the previous embodiments, wherein receiving the instruction(s) comprises receiving a Redundancy Version (RV) in the DCI, wherein the RV can be identical or different across the plurality of slots/mini-slots.

Embodiment 7: The method of embodiment 1, wherein: wherein receiving the instruction(s) comprises receiving the instruction(s) comprising explicit information related to the slot-based configuration in the plurality of slots/mini-slots in the half-duplex system; and determining the multiple consecutive uplink symbols comprises determining the multiple consecutive uplink symbols in the one or more of the plurality of slots/mini-slots based on the explicit information received from the network node.

Embodiment 8.1: The method of embodiment 7, wherein: receiving the instruction(s) comprising explicit information related to the slot-based configuration comprises receiving the slot-based configuration comprising a cell-specific pattern and a UE-specific pattern, each pattern classifying an uplink symbol(s)-downlink symbol(s)-flexible symbol(s) pattern in a slot; and determining the multiple consecutive uplink symbols comprises determining a dedicated pattern for transmitting the PUSCH repetitions based on the cell-specific pattern and the UE-specific pattern.

Embodiment 8.2: The method of embodiment 8.1, wherein: the cell-specific pattern comprises a pattern of downlink and flexible symbols; and the UE-specific pattern comprises a pattern of downlink and uplink symbols.

Embodiment 8.3: The method of embodiment 8.2, wherein the cell-specific pattern is DDFFFFFFFFFFFF and the UE-specific pattern is DDUUUUUUUUUUUU.

Embodiment 8.4: The method of embodiment 8.1, wherein the cell-specific pattern is indicated in a cell-specific information element (e.g., TDD-UL-DLCommon) and the UE-specific pattern is indicated in a UE-specific information element (e.g., TDD-UL-DL-Configuration-Common).

Embodiment 9: The method of any of the previous embodiments, wherein determining the dedicated pattern comprises reconfiguring the flexible symbol(s) in a slot as uplink symbol(s) for transmitting the PUSCH repetitions.

Embodiment 10: The method of any of the previous embodiments, wherein transmitting the PUSCH repetitions comprises transmitting the PUSCH repetitions in the flexible symbol(s) in a slot with lower transmit power.

Embodiment 11: The method of embodiment 7, wherein receiving the instruction(s) comprising explicit information related to the slot-based configuration comprises: receiving the slot-based configuration via RRC, the slot-based configuration classifies all symbols in each of the plurality of slots/mini-slots as flexible symbols; and receiving a slot format indicator (SFI) via group common control channel, the SFI configured to reclassify some or all of the flexible symbols (as classified in the slot-based configuration) to downlink symbol(s) and uplink symbol(s), wherein the reclassified uplink symbol(s) are used to transmit the PUSCH repetitions.

Embodiment 12: The method of any of the previous embodiments, further comprising postponing the PUSCH repetitions if any of the PUSCH repetitions can cause conflict with a downlink symbol(s)/slot(s).

Embodiment 13: The method of any of the previous embodiments, wherein determining the multiple consecutive uplink symbols further comprises reclassifying a flexible symbol(s)/slot(s) as an uplink symbol(s)/slot(s) for transmitting the PUSCH repetitions.

Embodiment 14: The method of any of the previous embodiments, further comprising: performing a power measurement(s) in a neighboring network(s) during a pre-configured slot(s) for uplink transmissions; and taking one of the following actions: if the power measurement(s) fails to detect the neighboring network(s), proceed to receiving in downlink during a second set of pre-configured slot(s); if the power measurement(s) indicates the power in the neighboring network(s) is below a threshold, proceed to transmitting the PUSCH repetitions in the pre-configured slot(s); and, if the power measurement(s) indicates the power in the neighboring network(s) is above the threshold, proceed to transmitting the PUSCH repetitions in additional uplink slots/mini-slots to achieve a given data rate with higher reliability.

Embodiment 15: The method of any of the previous embodiments, further comprising: providing user data; and forwarding the user data to a host computer via the transmission to the base station.

Group B Embodiments

Embodiment 16: A method performed by a base station for configuring multi-slot PUSCH repetitions in a half-duplex system (e.g., a TDD system), the method comprising: providing (500) an instruction(s) comprising information (implicit or explicit) related to slot-based configuration in a plurality of slots/mini-slots in the half-duplex system to a wireless device (e.g., a UE); and receiving (502) PUSCH repetitions from the wireless device in multiple consecutive uplink symbols in one or more of the plurality of slots/mini-slots.

Embodiment 17: The method of embodiment 16, wherein providing the instruction(s) comprises providing the instruction(s) comprising implicit information related to the slot-based configuration in the plurality of slots/mini-slots in the half-duplex system to the wireless device.

Embodiment 18: The method of any of the previous embodiments, wherein providing the instruction(s) comprises providing a downlink control information (DCI) in a starting symbol(s) (e.g., $1^{st}$ or $2^{nd}$ symbols) in each of the plurality of slots/mini-slots, the DCI configured to instruct the UE to transmit the PUSCH repetitions in remaining symbols subsequent to the starting symbol(s) in each of the plurality of slots/mini-slots, the DCI further configured to indicate to the UE how many PUSCH symbols are to be repeated.

Embodiment 19: The method of any of the previous embodiments, wherein providing the instruction(s) comprises providing identical HARQ Process ID in the DCI in of the plurality of slots/mini-slots.

Embodiment 20: The method of any of the previous embodiments, wherein providing the instruction(s) comprises providing identical or different DCIs in the plurality of slots/mini-slots.

Embodiment 21: The method of any of the previous embodiments, wherein providing the instruction(s) comprises providing a Redundancy Version (RV) in the DCI, wherein the RV can be identical or different across the plurality of slots/mini-slots.

Embodiment 22: The method of embodiment 16, wherein providing the instruction(s) comprises providing the instruction(s) comprising explicit information related to the slot-based configuration in the plurality of slots/mini-slots in the half-duplex system to the wireless device.

Embodiment 23.1: The method of embodiment 22, wherein providing the instruction(s) comprises providing the slot-based configuration comprising a cell-specific pattern and a UE-specific pattern, each pattern classifying an uplink symbol(s)-downlink symbol(s)-flexible symbol(s) pattern in a slot.

Embodiment 23.2: The method of embodiment 23.1, wherein: the cell-specific pattern comprises a pattern of downlink and flexible symbols; and the UE-specific pattern comprises a pattern of downlink and uplink symbols.

Embodiment 23.3: The method of embodiment 23.2, wherein the cell-specific pattern is DDFFFFFFFFFFFF and the UE-specific pattern is DDUUUUUUUUUUUU.

Embodiment 23.4: The method of embodiment 23.1, wherein the cell-specific pattern is indicated in a cell-specific information element (e.g., TDD-UL-DLCommon) and the UE-specific pattern is indicated in a UE-specific information element (e.g., TDD-UL-DL-Configuration-Common).

Embodiment 24: The method of any of the previous embodiments, wherein providing the instruction(s) comprises reconfiguring the flexible symbol(s) in a slot as uplink symbol(s) for receiving the PUSCH repetitions.

Embodiment 25: The method of any of the previous embodiments, wherein receiving the PUSCH repetitions comprises receiving the PUSCH repetitions in the flexible symbol(s) in a slot with lower transmit power.

Embodiment 26: The method of embodiment 16, wherein providing the instruction(s) comprises: providing the slot-based configuration to the wireless device via RRC, the slot-based configuration classifies all symbols in each of the plurality of slots/mini-slots as flexible symbols; and providing a slot format indicator (SFI) to the wireless device via group common control channel, the SFI configured to reclassify some or all of the flexible symbols (as classified in the slot-based configuration) to downlink symbol(s) and uplink symbol(s), wherein the reclassified uplink symbol(s) are used to transmit the PUSCH repetitions.

Embodiment 27: The method of any of the previous embodiments, further comprising: obtaining user data; and forwarding the user data to a host computer or a wireless device.

Group C Embodiments

Embodiment 28: A wireless device for configuring multi-slot PUSCH repetitions in a half-duplex system (e.g., a TDD system), the wireless device comprising: processing circuitry configured to perform any of the steps of any of the Group A embodiments; and power supply circuitry configured to supply power to the wireless device.

Embodiment 29: A base station for configuring multi-slot PUSCH repetitions in a half-duplex system (e.g., a TDD system), the base station comprising: processing circuitry configured to perform any of the steps of any of the Group B embodiments; and power supply circuitry configured to supply power to the base station.

Embodiment 30: A User Equipment, UE, for configuring multi-slot PUSCH repetitions in a half-duplex system (e.g., a TDD system), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 31: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 32: The communication system of the previous embodiment further including the base station.

Embodiment 33: The communication system of the previous 2 embodiments, further including the UE, wherein the UE is configured to communicate with the base station.

Embodiment 34: The communication system of the previous 3 embodiments, wherein: the processing circuitry of the host computer is configured to execute a host application, thereby providing the user data; and the UE comprises processing circuitry configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 36: The method of the previous embodiment, further comprising, at the base station, transmitting the user data.

Embodiment 37: The method of the previous 2 embodiments, wherein the user data is provided at the host computer by executing a host application, the method further comprising, at the UE, executing a client application associated with the host application.

Embodiment 38: A User Equipment, UE, configured to communicate with a base station, the UE comprising a radio interface and processing circuitry configured to perform the method of the previous 3 embodiments.

Embodiment 39: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 40: The communication system of the previous embodiment, wherein the cellular network further includes a base station configured to communicate with the UE.

Embodiment 41: The communication system of the previous 2 embodiments, wherein: the processing circuitry of the host computer is configured to execute a host application, thereby providing the user data; and the UE's processing circuitry is configured to execute a client application associated with the host application.

Embodiment 42: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 43: The method of the previous embodiment, further comprising at the UE, receiving the user data from the base station.

Embodiment 44: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 45: The communication system of the previous embodiment, further including the UE.

Embodiment 46: The communication system of the previous 2 embodiments, further including the base station, wherein the base station comprises a radio interface configured to communicate with the UE and a communication interface configured to forward to the host computer the user data carried by a transmission from the UE to the base station.

Embodiment 47: The communication system of the previous 3 embodiments, wherein: the processing circuitry of the host computer is configured to execute a host application; and the UE's processing circuitry is configured to execute a client application associated with the host application, thereby providing the user data.

Embodiment 48: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 49: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 50: The method of the previous embodiment, further comprising, at the UE, providing the user data to the base station.

Embodiment 51: The method of the previous 2 embodiments, further comprising: at the UE, executing a client application, thereby providing the user data to be transmitted; and at the host computer, executing a host application associated with the client application.

Embodiment 52: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 53: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 54: The communication system of the previous embodiment further including the base station.

Embodiment 55: The communication system of the previous 2 embodiments, further including the UE, wherein the UE is configured to communicate with the base station.

Embodiment 56: The communication system of the previous 3 embodiments, wherein: the processing circuitry of the host computer is configured to execute a host application; and the UE is configured to execute a client application associated with the host application, thereby providing the user data to be received by the host computer.

Embodiment 57: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 58: The method of the previous embodiment, further comprising at the base station, receiving the user data from the UE.

Embodiment 59: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

What is claimed is:

1. A method performed by a wireless device for transmission of multi-slot Physical Uplink Shared Channel (PUSCH) repetitions in a half-duplex system, the method comprising:
    receiving information from a network node, the received information being related to slot-based configuration in a plurality of slots or mini-slots in the half-duplex system;
    determining multiple consecutive uplink symbols in the plurality of slots or mini-slots based on the information received from the network node; and
    transmitting PUSCH repetitions to the network node in the determined multiple consecutive uplink symbols in the plurality of slots or mini-slots,
    wherein:
        the received information comprises information that indicates a cell specific pattern and a wireless device specific pattern, each classifying an uplink symbol(s)-downlink symbol(s)-flexible symbol(s) pattern in a slot,
        the cell specific pattern comprises a pattern of downlink and flexible symbols,
        the wireless device specific pattern comprises a pattern of downlink and uplink symbols,
        the cell specific pattern is DDFFFFFFFFFFFF and the wireless device specific pattern is DDUUUUUUUUUUUU, and
        determining the multiple consecutive uplink symbols in each of the plurality of slots or mini-slots comprises determining a dedicated pattern for transmitting the PUSCH repetitions based on the cell specific pattern and the wireless device specific pattern.

2. The method of claim 1 wherein:
    the received information comprises, for each slot or mini-slot of the plurality of slots or mini-slots, a downlink control information (DCI) received in the slot or mini-slot that indicates multiple consecutive symbols in the slot or mini-slot that are uplink symbols to be used by the wireless device for the PUSCH repetitions; and
    determining the multiple consecutive uplink symbols in the plurality of slots or mini-slots comprises determining the multiple consecutive uplink symbols in the plurality of slots or mini-slots based on the DCI received in each of the plurality of slots or mini-slots.

3. The method of claim 2 wherein, for each slot or mini-slot of the plurality of slots or mini-slots, the multiple consecutive symbols in the slot or mini-slot indicated by the DCI as uplink slots are remaining symbols in the slot or mini-slot that occur after a symbol in which the DCI was received.

4. The method of claim 2 wherein, for each slot or mini-slot of the plurality of slots or mini-slots, the DCI indicates a Hybrid Automatic Repeat Request (HARQ) process identity (ID) wherein the HARQ process ID is identical across the plurality of slots or mini-slots.

5. The method of claim 2 wherein receiving the information comprises receiving identical or different DCIs in the plurality of slots or mini-slots.

6. The method of claim 2 wherein, for each slot or mini-slot in the plurality of slots or mini-slots, the DCI received in the slot or mini-slot comprises information that indicates a redundancy version (RV) wherein the RV can be identical or different across the plurality of slots or mini-slots.

7. The method of claim 1 wherein the cell specific pattern is indicated in a cell specific information element and the wireless device specific pattern is indicated in a wireless device specific information element.

8. The method of claim 1 wherein determining the dedicated pattern comprises reconfiguring one or more flexible symbols in a slot as one or more uplink symbols, respectively, for transmitting the PUSCH repetitions.

9. The method of claim 1 wherein transmitting the PUSCH repetitions comprises transmitting the PUSCH repetitions in the one or more flexible symbols in a slot with lower transmit power.

10. The method of claim 1 wherein the received information comprises:
    a slot-based configuration received via radio resource control (RRC) signaling, where the slot-based configuration classifies all symbols in each of the plurality of slots or mini-slots as flexible symbols; and
    for each slot or mini-slot, a slot format indicator (SFI) received via group common control channel, the SFI configured to reclassify some or all of the flexible symbols as classified in the slot-based configuration to uplink symbols, wherein the reclassified uplink symbols are used to transmit the PUSCH repetitions.

11. The method of claim 1 further comprising postponing the PUSCH repetitions if any of the PUSCH repetitions cause conflict with a downlink symbol(s), downlink slot(s), or downlink mini-slot(s).

12. The method of claim 1 wherein determining the multiple consecutive uplink symbols further comprises reclassifying a flexible symbol(s) or slot(s) as an uplink symbol(s) or slot(s) for transmitting the PUSCH repetitions.

13. The method of claim 1 further comprising:
    performing a power measurement(s) in a neighboring network(s) during a pre-configured slot(s) for uplink transmissions; and
    taking one of the following actions:
        if the power measurement(s) indicates the power in the neighboring network(s) is below a threshold, transmit the PUSCH repetitions in the pre-configured slot(s); and
        if the power measurement(s) indicates the power in the neighboring network(s) is above the threshold, trigger scheduling of additional uplink slots or mini-slots to achieve a given data rate with higher reliability.

14. A wireless device for transmission of multi-slot Physical Uplink Shared Channel (PUSCH) repetitions in a half-duplex system, the wireless device comprising:
    one or more transmitters;
    one or more receivers; and
    processing circuitry associated with the one or more transmitters and the one or more receivers, the processing circuitry configured to cause the wireless device to:
        receive, from a network node, information related to slot-based configuration in a plurality of slots or mini-slots in the half-duplex system;
        determine multiple consecutive uplink symbols in the plurality of slots or mini-slots based on the information received from the network node; and
        transmit PUSCH repetitions to the network node in the determined multiple consecutive uplink symbols in the plurality of slots or mini-slots,
    wherein:
        the received information comprises information that indicates a cell specific pattern and a wireless device specific pattern, each classifying an uplink symbol(s)-downlink symbol(s)-flexible symbol(s) pattern in a slot, the cell specific pattern comprises a pattern of downlink and flexible symbols, the wireless device specific pattern comprises a pattern of downlink and uplink symbols, the cell specific pattern is DDFFFFFFFFFFFF and the wireless device specific pattern is DDUUUUUUUUUUUU, and determination of the multiple consecutive uplink symbols in each of the plurality of slots or mini-slots comprises determining a dedicated pattern for transmitting the PUSCH repetitions based on the cell specific pattern and the wireless device specific pattern.

15. A method performed by a base station for configuring multi-slot Physical Uplink Shared Channel (PUSCH) repetitions in a half-duplex system, the method comprising:

providing information related to slot-based configuration in a plurality of slots or mini-slots in the half-duplex system to a wireless device; and receiving PUSCH repetitions from the wireless device in multiple consecutive uplink symbols in one or more of the plurality of slots or mini-slots, in accordance with the provided information, wherein:

the provided information comprises information that indicates a cell specific pattern and a wireless device specific pattern, each classifying an uplink symbol(s)-downlink symbol(s)-flexible symbol(s) pattern in a slot, the cell specific pattern comprises a pattern of downlink and flexible symbols, the wireless device specific pattern comprises a pattern of downlink and uplink symbols, the cell specific pattern is DDFFFFFFFFFFFF and the wireless device specific pattern is DDUUUUUUUUUUUU, and receiving of the multiple consecutive uplink symbols in each of the plurality of slots or mini-slots comprises receiving a dedicated pattern for receiving the PUSCH repetitions based on the cell specific pattern and the wireless device specific pattern.

16. The method of claim 15 wherein:

the provided information comprises, for each slot or mini-slot of the plurality of slots or mini-slots, a downlink control information (DCI) provided in the slot or mini-slot that indicates multiple consecutive symbols in the slot or mini-slot that are uplink symbols to be used by the wireless device for the PUSCH repetitions.

17. The method of claim 16 wherein, for each slot or mini-slot of the plurality of slots or mini-slots, the multiple consecutive symbols in the slot or mini-slot indicated by the DCI as uplink slots are remaining symbols in the slot or mini-slot that occur after a symbol in which the DCI was received.

* * * * *